Nov. 30, 1965  L. COATALEN  3,220,512
SPOT TYPE DISC BRAKES
Filed May 15, 1962  2 Sheets-Sheet 1
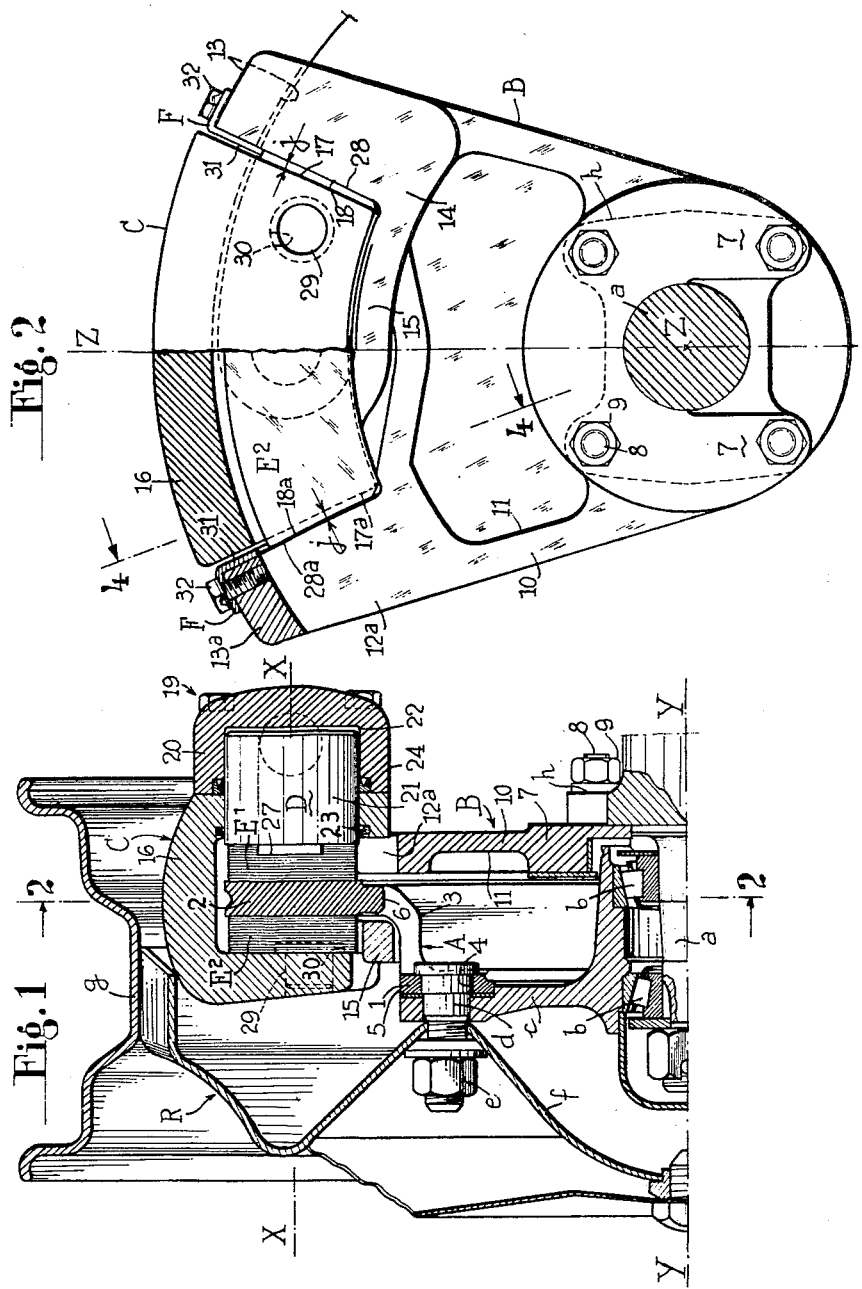
INVENTOR:
LOUIS COATALEN
By
Richardson, David and Vardon
ATTYS.

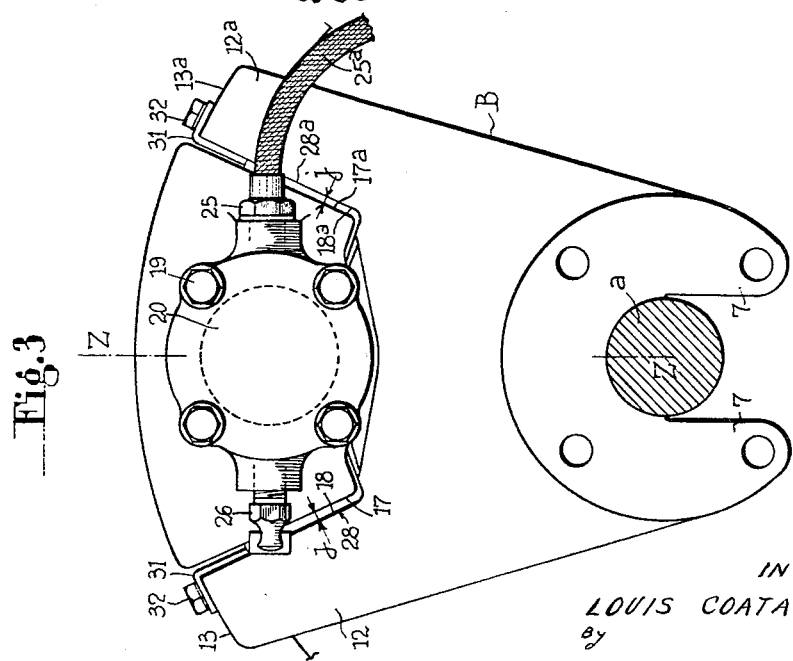

United States Patent Office 3,220,512
Patented Nov. 30, 1965

3,220,512
SPOT TYPE DISC BRAKES
Louis Coatalen, Paris, France, assignor to D.B.A. (Ducellier-Bendix-Air Equipment), Paris, France, a corporation of France
Filed May 15, 1962, Ser. No. 199,556
8 Claims. (Cl. 188—73)

The present invention relates to disc brakes, more particularly disc brakes for use with the wheels of motor vehicles.

This application is a continuation-in-part of my copending allowed application Serial No. 862,633 filed on December 29, 1959, now abandoned.

The disc brake of the present invention comprises a brake rotor having circular friction surfaces at opposite sides thereof and a pair of friction members or friction linings disposed at opposite sides of the rotor for simultaneously applying braking force to the two friction surfaces. The friction members are supported intermediate the arms of a fixed support or yoke member, circumferential movement of the friction members during braking being limited by engagement with the arms. The arms extend from a base portion of the yoke member outwardly, axially over the periphery of the disc and then inwardly toward the axis of the rotor. The ends of the arms are interconnected by a circumferential member upon which one of the friction members is axially slidably supported. The other friction member is similarly supported by the base portion of the yoke member. A floating stirrup member is mounted on the friction members so that the stirrup member and the friction members are readily removable as a unit. The stirrup member, which includes a hydraulic cylinder for applying braking forces to the friction members, straddles the rotor intermediate the arms of the yoke member. The friction members are held against radial outward movement by readily disengageable fastening devices. The friction members are thus retained in a radially outwardly opening recess defined by the base portion of the yoke member, the arms and the circumferential member.

The stirrup member does not touch any part of the yoke member so that braking forces are transmitted directly to the yoke member by the friction members.

Various additional features, objects and advantages of the invention will become apparent from the following specification, reference being had to the accompanying drawing forming a part thereof.

Referring to the drawing:

FIG. 1 is a radial axial cross-section of an improved brake according to the invention.

FIG. 2 is an elevational view of the brake shown in FIG. 1, the left hand half of FIG. 2 being broken away and shown in section taken along the line 2—2 of FIG. 1, looking in the direction of the arrows.

FIG. 3 is an elevational view looking leftwardly toward the brake shown in FIG. 1.

FIG. 4 is a radial axial section along line 4—4 of FIG. 2.

FIG. 5 is a fragmentary view of a portion of the disc of the brake at the wheel side.

FIG. 6 is a radial axial section along line 6—6 of FIG. 5.

In the embodiment shown, the brake according to the invention is applied to a road vehicle wheel.

The hub $c$ of the wheel R is rotationally mounted with the interposition of bearings $b$, on the axle $a$ (FIG. 1) by means of bolts $d$ and nuts $e$.

The brake according to the invention and adapted to this wheel comprises in combination: an annular brake disc member A constituting the "disc" integral with the wheel R, and on which is carried a support member or yoke B fixed to the axle $a$; a stirrup member C mounted floatingly in this yoke B, in which it may move along the axis X—X parallel to the rotational axis Y—Y of the wheel R; a hydraulic cylider device D mounted on the stirrup member, and adapted to press two friction members or linings $E^1$ and $E^2$ located in the latter, against the disc A; and detachable or disengageable locking members F (FIG. 2) for radially locking the friction members $E^1$ and $E^2$ and thus the stirrup member C in the yoke B.

Braking is brought about by the application of the linings $E^1$ and $E^2$ against the rotor or disc A under the action of the device D, the braking torque being transmitted independently of the stirrup member C directly to the fixed yoke B by the linings $E^1$ and $E^2$.

The general combination having been thus described, each of the above devices will now be explained in detail.

The disc A is formed by two annular flat portions at right angles to the axis X—X, one of them being a central supporting portion 1 and the other a peripheral braking portion 2, joined together (FIGS. 1, 4, 5) by an intermediate portion 3. The central portion 1 is drilled with as many mounting holes 4 as there are bolts $d$ for securing the web $f$ of the wheel R to the hub $c$. The peripheral surface 5 of the portion 1 of the disc has a diameter equal to that of the hub $c$ of the wheel R. Adjacent to each hole 4 the disc A is provided with cavities 6 which:

Allow—in the case of some of them at least—easy access to the bolts $d$ while reducing the size of the connecting portion 3 of the disc A and thereby leaving more space around this portion 3 for the braking portion proper, 2;

Impart a certain flexibility to the connection between the portions 1 and 2;

Enhance the ventilation necessary for cooling the braking portion 2.

The yoke B is fixed to the axle $a$. For this purpose it comprises a bifurcated mounting flange 7 (FIGS. 2, 3) which is adapted to straddle the axle $a$ at a collar $h$ (FIGS. 1 and 2) to which it is secured by means of bolts 8 and nuts 9.

Proceeding upwardly from the bifurcated portion 7, yoke B is shaped radially first in the form of a sector 10, lightened more or less at 11 by thinning, then finally into a branched formation open towards the periphery to produce two arms which are symmetrical with respect to an axial radial plane Z—Z (FIGS. 2 and 3). Each of these arms is U-shaped in section through a radial axial plane. Actually, each of these arms comprises an extension 12 or $12^a$ of the sector portion 10, a peripheral axially extending top 13 or $13^a$ and a radially inwardly extending end portion 14 or $14^a$ parallel with, but at a certain distance from the extension portions 12 and $12^a$. The two end portions 14 and $14^a$ are joined by a circumferentially extending stiffening bar 15 which, by reason of cavities 6, may be positioned in the immediate vicinity of the outer surface 5 of the hub $c$ and of the central portion 1 of the brake disc A.

The inverted U-shaped arms of the yoke B straddle the brake disc A without touching the braking portion 2 of the disc or its periphery. The friction members $E^1$ and $E^2$, which support the stirrup member C, are located in the yoke B. The actuating device or stirrup member C is supported by the friction members $E^1$ and $E^2$ so that it is maintained spaced from all portions of the support member B. The stirrup member C is thus supported directly by the friction members $E^1$ and $E^2$ exclusively of all other portions of the brake.

This stirrup member C comprises a body 16 spaced from the yoke B and straddling the disc A. The body 16 has in fact the form of a segment of a torus of U-shaped section open towards the axis of the wheel. Its peripheral expanse is such that when fitted in the yoke B, in normal position there are slight clearances *j* between the lateral radial edges 17 and 17ᵃ (FIGS. 2 and 3) of the stirrup member and the inner edges 18, 18ᵃ of the arm portions of the yoke B.

At the side of the yoke B remote from the wheel R, a cylinder 20 is mounted by screws 19 on the body 16 of the stirrup member. A piston 21 is axially movable in cylinder 20, the fluid-tightness of the chamber 22 (FIG. 1) provided in the cylinder 20 being ensured by packing rings 23, 24.

A union 25 (FIG. 3) terminating a flexible hose 25ᵃ enables hydraulic braking oil under pressure to be admitted into the cylinder 20. This flexible hose allows removal of the stirrup member for the purpose of changing the linings, without having to uncouple the hydraulic circuit.

A screw 26 enables the cylinder to be evacuated.

Piston 21 is centred by its extremity 27 in the first friction lining E¹ adapted to thrust against the adjacent flat surface of the peripheral portion 2 of the brake disc A. A symmetrical lining E² is placed between the stirrup body 16 and the opposite face of the disc A.

The friction members or linings E¹ and E² may be solely of friction material—which is an advantage from the point of view of noise due to vibrations—or of an assembly (riveted or adhesively attached) of this material with a metallic support. They are of such a shape and circumferential expanse that they protrude at both extremities beyond the stirrup member C and abut with their edges 28, 28ᵃ against the inner edges 18 and 18ᵃ of the arms of the yoke B.

The stirrup member C is centred with respect to these linings and, consequently with respect to this yoke:

On the one hand by the end 27 of piston 21 centred in a recess in the lining E¹;

And on the other hand by two studs 29, fitted in holes in the stirrup member C and each provided with a head fitting in a recess 30 (FIGS. 1 and 2) in the lining E².

Finally, devices F for locking the friction members E¹, E² against outward radial movement in the yoke B comprise two angle pieces 31 secured to the yoke B by means of screws 32. The radial flange of each of these angle pieces fits into the space *j* between the stirrup member and the yoke and thrust against the linings E¹ and E² (FIG. 4).

It will be clear that when cylinder 20 is not under hydraulic pressure, the disc A rotates between the two linings E¹ and E² without being braked, the linings either being withdrawn by a given distance away from the disc, or continuing to remain in contact with the disc without being under pressure.

When hydraulic oil under pressure is passed through the flexible conduit 25ᵃ into the cylinder 20, the piston 21 thrusts the lining E¹ against the disc A, while the other lining E² is likewise urged against it by the reaction exerted against the cylinder 20 and through the latter against the body 16 of the stirrup member.

The braking torque is applied directly by these linings E¹ and E² to the yoke B and through the latter to the axle *a* without the stirrup member C participating in this transmission of braking force. This stirrup member centered at three points 27, 28, 29 on the linings, has no other purpose than to carry the hydraulic operating device D.

Each locking member F has a pair of axially spaced projecting fingers which engages the radially outer edges of a respective one of the friction linings E¹ and E². As the linings E¹, E² are held in the yoke B solely by the disengageable locking members F, dismantling is quite easy and worn linings can be rapidly changed.

By reason of its shape, the fixed yoke B ensures:

That, by contact in circumferential direction, there is ready co-operation with the linings E¹, E² for the transmission of braking torque;

That this yoke can be easily mounted on the axle *a* which it straddles;

That the circumferential bar 15 joining end portions 14 and 14ᵃ of both arms of the yoke causes these two arms to participate in the bending action due to the braking torque.

Clearance for this bar 15 is made possible by the cavities 6 of the intermediate portion 3 of disc A, without having to increase the outer diameter of the brake—made impossible by the dimensions imposed from the rim *g* of the wheel R—and without reducing its hub from dimensional limitations also imposed.

While I have shown and described what I believe to be the best embodiments of my invention, it will be apparent to those skilled in the art that various changes and modifications may be made therein without departing from the spirit and scope of the invention as defined in the appended claims.

What is claimed is:

1. A disc brake comprising: a fixed supporting member; a braking disc rotatable within said supporting member, said supporting member being cut away to define a space exposing an edge portion of the periphery of said disc together with a contiguous portion of said disc including spaced parallel braking areas on opposite sides of said disc, said braking areas being located radially inwardly of said exposed portion of said periphery; friction means laterally confined by said supporting member within the circumferential limits of said space and providing braking surfaces at both sides of said disc, said braking surfaces acting on said disc at said braking areas; actuating means for applying braking pressure between said braking surfaces and said disc; and releasable retaining means operably connected to said supporting member holding said friction means and said actuating means in an operative position relative to said supporting member for applying said braking pressure, said actuating means being movable parallel to said braking surfaces freely outwardly past said exposed portion of said periphery when said retaining means is released.

2. A disc brake according to claim 1, wherein said retaining means comprises circumferentially spaced locking members located at opposite sides of said space.

3. A disc brake according to claim 1, wherein said actuating means comprises a stirrup member straddling said exposed periphery of said disc and said friction means, said stirrup member comprises a cylinder housing opposite one of said braking areas and a leg opposite the other braking area, a piston is slidable within said cylinder housing, said friction means comprises two friction members each of which provides one of said braking surfaces, one of said friction members is operably connected with said piston and the other of said friction members is operably connected with said leg, whereby said piston will force the braking surface of its respective friction member into engagement with its respective braking area and hydraulic reaction of said cylinder will move said stirrup to bring the braking surface of the other friction member into engagement with its braking area, said releasable retaining means being positioned to serve as a guide for movement of said stirrup.

4. A disc brake comprising: a fixed supporting member; a braking disc rotatable within said supporting member, said supporting member being cut away to define a space exposing a portion of the periphery of said disc together with a contiguous portion thereof including braking areas on opposite sides of said disc located radially inwardly of said exposed portion of said periphery; said braking areas being parallel to each other; friction means confined within the circumferential limits of said space and providing braking surfaces at both sides of said disc, said braking surfaces acting on said disc at said braking areas; actuating means for applying braking pressure between said braking surfaces and said disc, said actuating means and friction means being interconnected to form a unit which straddles said exposed portion of said periphery and is freely outwardly removable from said brake as a unit past said exposed portion of said periphery; and releasable retaining means connected to said supporting member holding said unit positioned on said supporting member for applying said braking pressure.

5. A disc brake according to claim 4, wherein said retaining means comprises locking members engaging circumferentially spaced portions of said unit.

6. A disc brake according to claim 4, wherein said actuating means comprises a stirrup member straddling said exposed periphery of said disc and said friction means, said stirrup member comprises a cylinder housing opposite one of said braking areas and a leg opposite the other braking area, a piston is slidable within said cylinder housing, said friction means comprises two friction members each of which provides one of said braking surfaces, one of said friction members is operably connected with said piston and the other of said friction members is operably connected with said leg, whereby said piston will force the braking surface of its respective friction member into engagement with its respective braking area and hydraulic reaction of said cylinder will move said stirrup to bring the braking surface of the other friction member into engagement with its respective braking area, said stirrup member and said friction members forming said unit, said releasable retaining means being positioned to serve as a guide for movement of said stirrup.

7. A disc brake according to claim 4, wherein said friction means comprises a pair of friction members having outer edges located in proximity to said exposed portion of said periphery, and in which said retaining means comprises locking members effectively interconnecting circumferentially spaced portions of said outer edges and said supporting member for retaining said unit positioned on said supporting member.

8. A brake comprising: a rotatable disc having spaced flat circular friction surfaces on opposite sides thereof; a fixed support member comprising a base portion and two circumferentially spaced generally U-shaped arms extending outwardly from said base portion in a plane generally perpendicular to the rotational axis of said disc along one of said friction surfaces beyond the outer periphery thereof, then in an axial direction across the periphery of said disc and then inwardly in a plane generally perpendicular to said axis along the other of said friction surfaces and terminating radially inwardly of said periphery; said support member comprising a further portion located opposite said other friction surface extending transversely between and interconnecting the terminal portions of said arms; said base portion, said arms and said transverse portion exposing opposed portions of said friction surfaces on each side of said disc and a corresponding peripheral portion of said disc; a detachable unit supported by said support member; said unit comprising a stirrup member which in a normal operating position extends axially across said exposed peripheral portion of said disc and has a pair of legs each positioned opposite a respective one of said exposed friction surfaces; said detachable unit further comprising two friction members each connected to a respective leg of said stirrup member and when in a normal operating position being interposed between its respective leg portion and a respective one of said friction surfaces and located between said circumferentially spaced arms; a fluid actuated piston in one of said legs slidably mounted for movement toward and away from said friction surfaces; said piston being connected to one of said friction members, the other of said leg portions having a thrust connection with the other of said friction members, whereby upon actuation of said brake said piston will move said one friction member into engagement with its respective friction surface and hydraulic reaction will move said stirrup transversely of said friction surfaces and engage said other friction member with its respective disc friction surface; a pair of retaining fingers located on opposite sides of said disc being carried by one of said arms and in a locking position terminating between said arms closely adjacent to said one arm; a second pair of retaining fingers located on opposite sides of said disc being carried by the other of said arms and in a locking position terminating between said arms closely adjacent to said other arm; each of said retaining fingers engaging an adjacent portion of the radial outer edge of one of said friction members for limiting outward movement of said detachable unit; means releasably securing each of said retaining fingers in said locking position whereby upon release of all of said retaining fingers out of said locking position, said unit may be removed from its normal position.

References Cited by the Examiner

UNITED STATES PATENTS

| 2,762,460 | 9/1956 | Butler | 188—152 |
| 2,918,990 | 12/1959 | Davis | 188—73 |
| 3,053,346 | 9/1962 | Butler | 188—73 |

FOREIGN PATENTS

| 714,962 | 9/1954 | Great Britain. |

ARTHUR L. LA POINT, *Primary Examiner.*

EUGENE G. BOTZ, *Examiner.*